US010645202B2

(12) United States Patent
Liu

(10) Patent No.: US 10,645,202 B2
(45) Date of Patent: May 5, 2020

(54) GEOLOCATION FOR INTERNET PROTOCOL PACKETS

(71) Applicant: Charter Communications Operating, LLC, St. Louis, MO (US)

(72) Inventor: Chia J. Liu, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 59 days.

(21) Appl. No.: 16/128,659

(22) Filed: Sep. 12, 2018

(65) Prior Publication Data

US 2020/0084303 A1 Mar. 12, 2020

(51) Int. Cl.
*H04L 29/12* (2006.01)
*H04L 29/06* (2006.01)

(52) U.S. Cl.
CPC .......... *H04L 69/22* (2013.01); *H04L 61/2007* (2013.01)

(58) Field of Classification Search
CPC .......................... H04L 69/22; H04L 61/2007
See application file for complete search history.

(56) References Cited

U.S. PATENT DOCUMENTS

2011/0247068 A1* 10/2011 Tolliver .................. H04L 41/12
  726/22
2015/0371152 A1* 12/2015 Rubsamen ............. G06Q 10/02
  705/5
2016/0036777 A1* 2/2016 Bartlett ................ H04L 61/609
  709/245

* cited by examiner

*Primary Examiner* — Angel T Brockman
(74) *Attorney, Agent, or Firm* — The Marbury Law Group, PLLC

(57) ABSTRACT

Systems, methods, and devices of the various embodiments may enable geolocation information for a computing device to be indicated in Internet Protocol (IP) packets. Various embodiments may provide IP packets, such as IP version 6 (IPv6) packets, etc., including one or more location attributes in an IP packet header. For example, one or more location attributes may be included in a geolocation (GLO) option of a destination options header. In various embodiments, the one or more location attributes may include country indications, region indications, city indications, and/or postal code indications associated with a computing device that generated the IP packet.

18 Claims, 10 Drawing Sheets

GEOLOCATION FOR INTERNET PROTOCOL PACKETS

BACKGROUND

In conventional system, servers hosting Internet based applications often check locality information of the computing device originating an Internet Protocol (IP) packet. By checking such locality information the server may aide the operation of the Internet based applications that are provided to the computing device originating an Internet Protocol (IP) packet. As examples, locality information of incoming IP traffic is often checked in conventional systems to assist in the selection of the closest serving locations for directing IP traffic, to prevent online fraud, and to infer likely native language for use in Internet based applications.

However, in conventional systems the dissemination of accurate geolocation data is complicated by the lack of centralized coordination and communication of geolocation data. Updating geolocation information in conventional systems is typically achieved via updates to IP block location information on an IP block website of a geolocation service, via email bulk transfer of IP block location information, and via geolocation feeds. Updates in geolocation information in conventional systems can take weeks to even months and the updates can be sporadic and inaccurate in conventional systems. The delay and uneven distribution of location updates in conventional systems negatively impacts the provisioning of Internet based applications in conventional systems and can result in customer complaints to Internet Service Providers (ISPs).

SUMMARY

The systems, methods, and devices of the various embodiments disclosed herein may enable geolocation information for a computing device to be indicated in Internet Protocol (IP) packets. Various embodiments may provide IP packets, such as IP version 6 (IPv6) packets, etc., including one or more location attributes in an IP packet header. For example, one or more location attributes may be included in a geolocation (GLO) option of a destination options header. In various embodiments, the one or more location attributes may include country indications, region indications, city indications, and/or postal code indications associated with a computing device that generated the IP packet.

Various embodiments may provide a method of indicating IP packet source geolocation performed by a processor of a computing device. The method may include determining one or more location attributes associated with a current physical location of the computing device, inserting an indication of the one or more location attributes into an IP packet header, and transmitting the IP packet header to an IP address. In various embodiments, the one or more location attributes may be one or more of a country, a region, a city, and a postal code associated with the current physical location of the computing device that generated the IP packet. In various embodiments, the IP packet header may be a destination options header and the indication of the one or more location attributes may be a geolocation option. In various embodiments, the geolocation option may have a length of 32 bytes. In various embodiments, the geolocation option may include a 2 byte country field, a 5 byte region field, a 16 byte city field, and a 9 byte postal code field. In various embodiments, the one or more location attributes associated with the current physical location may be user provided indications of one or more of a country, a region, a city, and a postal code in which the user is using the computing device.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
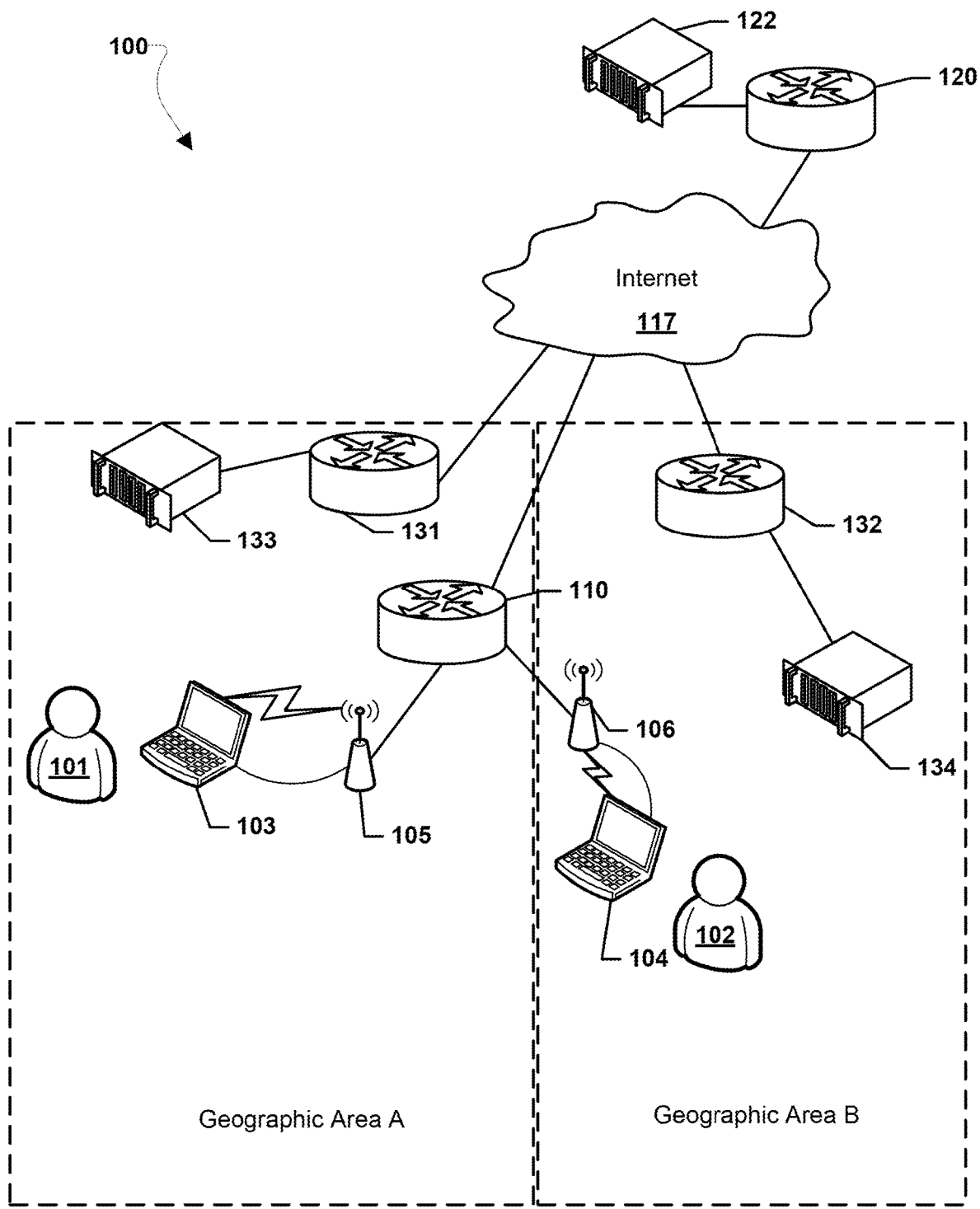
FIG. 1 is a communication system block diagram of an Internet Protocol (IP) network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" and "node" are used interchangeably herein to refer to any one or all of satellite or cable set top boxes, laptop computers, rack mounted computers, routers, cable modem termination systems (CMTSs), gateways, network adapters, cellular telephones, smart phones, personal or mobile multi-media players, personal data assistants (PDAs), personal computers, tablet computers, smart books, palm-top computers, desktop computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

The systems, methods, and devices of the various embodiments disclosed herein may enable geolocation information for a computing device to be indicated in Internet Protocol (IP) packets. Various embodiments may provide IP packets, such as IP version 6 (IPv6) packets, etc., including one or more location attributes in an IP packet header. For example, one or more location attributes may be included in a geolocation (GLO) option of a destination options header. In various embodiments, the one or more location attributes may include country indications, region indications, city indications, and/or postal code indications associated with a computing device that generated the IP packet. Through the provisioning of geolocation information, such as one or more location attributes, in the IP packet headers, the various embodiments may alleviate the delay and uneven distribution of location updates experienced in conventional systems and improve the provisioning of Internet based applications.

In various embodiments, a computing device may package data for transmission into an IP packet, such as an IPv6 packet, etc. The data may be data for an Internet based application (e.g., Pandora®, Netflix®, Facebook®, Hulu®, online gaming, DirectTV streaming video, etc.). For example, the data may be data used to request provisioning of the Internet based application to the computing device. In some embodiments, the data to be packaged into an IP packet may be initial data enabling a handshake operation between the computing device and a server providing an Internet based application to occur. For example, the data may enable a Transmission Control Protocol (TCP) based request for Internet based application services.

In various embodiments, a computing device may be configured to determine its current physical location. In some embodiments, the current physical location may be determined based on user input to the computing device. For example, a user may input one or more of the country, region, city, postal code, address, latitude, longitude, etc., at which the computing device is currently being used into a graphical user interface provided by the operating system (e.g., Windows®, MacOS®, Linux®, etc.) and/or another application running on a processor of the computing device. In such examples, the current physical location information entered by the user may be stored in a memory location of the computing device. The computing device may determine its current physical location by reading the information stored at the memory location. In some embodiments, the current physical location of the computing device may be determined based on information provided by a location device, such as coordinates from a global navigation satellite system (GNSS) chip set of the computing device, location information provided by another connected computing device, etc. In some embodiments, the current physical location of the computing device may be determined based on combinations of user entered information and information provided by a location device. In various embodiments, the computing device may determine one or more location attributes associated with the current physical location. For example, the computing device may determine country indications, region indications, city indications, and/or postal code indications associated with its current physical location. As one example, the computing device may determine the one or more location attributes based on the one or more attributes being stored as the current physical location in a memory location. As another example, the computing device may determine the one or more location attributes by correlating a coordinate (e.g., a latitude and longitude) to a location on a map stored in a memory and determining the location attributes for the correlated location as the one or more location attributes associated with the current physical location.

In various embodiments, the computing device may insert an indication of the determined one or more location attributes associated with its current physical location into the IP packet header. For example, a computing device may populate the indication of the determined one or more location attributes as geolocation information in the GLO option of a destination options header of an IP packet, such as an IPv6 packet, etc. The indications may include one or more of country indications, region indications, city indications, and/or postal code indications associated with a computing device. In some embodiments, the computing device may insert the indication of the determined one or more location attributes associated with the current physical location into every packet to be transmitted by the computing device. In some embodiments, the computing device may insert the indication of the determined one or more location attributes associated with the current physical location into one a first or a first few packets to be transmitted by the computing device. For example, in TCP based requests only the first few packets used for establishing the TCP handshake may have the indications inserted therein. In various embodiments, in response to inserting the indication of the determined one or more location attributes associated with its current physical location into the IP packet header, the computing device may transmit the IP packet with the inserted IP packet header. For example, the computing device may transmit the IP packet with the inserted IP packet header via a wired or wireless connection to a gateway router of an Internet Service Provider (ISP). In some embodiments, the current physical location and/or attributes associated with the current physical location may not be determinable by the computing device. In response to no current physical location and/or attributes associated with the current physical location being determinable, the computing device may insert a blank indication in the IP packet header or may insert any location related indication in the IP packet header.

As an example, a GLO option of a destination options header of an IP packet, such as an IPv6 packet, etc., according to various embodiments may be optional. The destination options header may be used to carry optional information that needs to be examined only by a packet's destination nodes and may be identified by a next header value of 60 in an immediately preceding header. As an example, a GLO option of a destination options header of an IP packet, such as an IPv6 packet, etc., according to various embodiments may be a 34 byte header indicating its option type, the option data length, a country code, a region, a city, and a postal code. The first two bytes of data of the GLO option may indicate attributes of the GLO option. As a specific example, the first eight bits being a value of three may identify the GLO option and the second eight bits being a value of four may indicate the length of the GLO option data is 32 bytes. The GLO option may include a country code field, a region field, a city field, and a postal code field. As specific examples, a country code field may be a two byte field indicating a country code (e.g., US for United States, CN for China, JP for Japan, PL for Poland, etc.). A region field may be a five byte field indicating the International Organization for Standardization (ISO) region code, such as the region code conforming to ISO standard 3166-2 (e.g., US-CO for the US state of Colorado, CN-GD for Guangdong province in China, etc.). A city field may be a sixteen byte field indicating the name of a city (e.g., New York, Paris, etc.). The name of the city may be padded with leading blanks if shorter than 15 characters, may be truncated if longer than 15 characters, and spaces in the city name may be counted as character and left blank. A postal code field may be a nine byte field. When the postal code is less than nine digits it may have leading zeros. For example, a five digit US postal code for Greenwood Village, Colo. of 80111 may be reflected by a postal code of 000080111 with four leading zeros.

In various embodiments, a first computing device in a routing path receiving an IP packet, such as a gateway of an ISP that receives IP packets from an IP packet originating computing device, may determine whether one or more location attributes are indicated in the IP packet. For example, the computing device may determine whether a GLO option of a destination options header is included in the IP packet to determine whether one or more location attributes are indicated in the IP packet. In response to determining that no location attributes are indicated in the IP packet, the computing device may add its own location attributes to the packet, for example in a GLO option of a destination options header appended to the received IP packet. In this manner, location information at least of the network edge may be enforced by the first computing device in a routing path receiving an IP packet, such as a gateway of an ISP that receives IP packets from an IP packet originating computing device. In response to determining that location attributes are indicated in the IP packet, the computing device may determine whether the location attributes are valid. For example, when the computing device is a gateway of an ISP, the computing device may compare a country indication in the GLO option of a destination options header to a country indication for where the gateway is located. The country indications not matching may indicate the computing device generating the IP packet did not insert valid location attributes. The gateway may respond to the computing device sending the packet with an indication of an invalid location attribute.

In various embodiments, a computing device receiving an IP packet addressed to that computing device, such as a server of an Internet based application (e.g., Pandora®, Netflix®, Facebook®, Hulu®, online gaming, DirectTV streaming video, etc.), may determine whether one or more location attributes are indicated in the IP packet. For example, the computing device may determine whether a GLO option of a destination options header is included in the IP packet to determine whether one or more location attributes are indicated in the IP packet. In response to determining that no location attributes are indicated in the IP packet, the computing device receiving an IP packet addressed to that computing device, such as a server of an Internet based application (e.g., Pandora®, Netflix®, Facebook®, Hulu®, online gaming, etc.), may apply location agnostic packet handling procedures to the IP packet. In response to determining that location attributes are indicated in the IP packet, the computing device receiving an IP packet addressed to that computing device, such as a server of an Internet based application (e.g., Pandora®, Netflix®, Facebook®, Hulu®, online gaming, etc.), may determine the location of the computing device that originated the IP packet based on the one or more location attributes. For example, a server of an Internet based application may use one or more of the country indications, region indications, city indications, and/or postal code indications indicated in a GLO option of a destination options header to determine the location of the originating computing device. In response to determining the location of the originating computing device, the computing device receiving an IP packet addressed to that computing device, such as a server of an Internet based application (e.g., Pandora®, Netflix®, Facebook®, Hulu®, online gaming, etc.), may handle the packet according to the determined location. For example, a server of an Internet based application may select a closest server to the location of the originating computing devices from which to provision services. As another example, the server of an Internet based application may select a most likely language in which to provide the service based on the location of the originating computing device. As a further example, the server of an Internet based application may enforce geographic content restrictions based on the location of the originating computing device.

Various examples of different protocols are discussed herein, such as IPv6, TCP, etc. The discussions of specific protocols, such as IPv6, TCP, etc., are provided merely as examples to better illustrate the aspects of the various embodiments, and are not intended to limit the various embodiments in any way. Other protocols may be used with the various embodiments, and the other protocols may be substituted in the various examples without departing from the spirit or scope of the invention.

FIG. 1 illustrates an IP network 100 suitable for use with various embodiments. The IP network 100 may include multiple computing devices, such as customer computing devices 103, 104, customer premises equipment (CPE) 105, 106 (e.g., cable modems/routers, gateways, etc.), one or more network routers 110, 120, 131, 132, and one or more application servers 122, 133, 134. The customer computing devices 103, 104 may exchange data via one or more wired or wireless connections with the CPEs 105, 106. The CPEs 105, 106 may be connected via an Internet Service Provider (ISP) network, such as a hybrid fiber-coaxial (HFC) network, to one or more network routers 110. The network routers 110 may enable data to be exchanged between the customer computing devices 103, 104, CPEs 105, 106, and the Internet 117 over the ISP network. Application servers 122, 133, 134 may be connected to respective one or more routers 120, 131, 132 that may connect to the Internet 117. Via the one or more routers 110, 120, 131, 132 and their connections to the Internet 117, the customer computing devices 103, 104, the CPEs 105, 106, and the application servers 122, 133, and 134 may exchange data with one another over the Internet 117 in packets according to various protocols, such as IPv6, etc.

IP network 100 may span multiple different geographic areas, such as geographic area A and geographic area B. As examples, geographic areas A and B may be two different cities, countries, states, postal code areas, regions, etc. Customer computing devices 103, 104 may be located at different physical locations in the IP network 100. For example, customer computing device 103 may be at a current physical location in geographic area A, while customer computing device 104 may be at a current physical location in geographic area B. The different current physical locations of the customer computing devices 103, 104 may be associated with different location attributes, such as different country indications, different region indications, different city indications, and/or different postal code indications. In a similar manner, the CPEs 105, 106 may also be located in respective ones of the different geographic areas A and B.

While the customer computing devices 103, 104 and CPEs 105, 106 may be located in different geographic areas A and B, respectively, both CPEs 105, 106 may be connected to a network router 110 of the same ISP located in geographic area A. Such a connection to a network router 110 in one geographic area A by devices in another geographic area B may occur when those devices are physically located at an edge of the geographic area B, such as near a county or state line. Relying on the location of the network router 110 to define the physical location of the devices connected to it, such as devices 103, 104, 105, 106, may inaccurately define devices located in geographic area B, such as devices 104, 106, as being located in geographic area A. Based on such inaccurate location definitions, an application server 122 may select the application server 133 in geographic area A to provision services to customer computing device 104 even though application server 134 may be a closer application server to customer computing device 104 as application server 134 is actually located in geographic area B along with customer computing device 104. Similarly, application server 122 may authorize or block services for customer computing device 104 as application server 122 may determine improperly that customer computing device 104 is located in geographic area A. For example, some video streaming services may not provide services in other geographic locations (e.g., countries) due to geographic licensing terms. Thus, devices located along the border in country 1, but connected to a server across the border in country 2, may not receive streaming service.

Various embodiments may resolve the ambiguity in the geolocation of computing devices, such as customer computing devices 103, 104, by accurately indicating geolocation information for the computing devices in IP packets. In various embodiments, computing devices, such as customer computing devices 103, 104, CPEs 105, 106, etc., may be configured to indicate one or more location attributes in an IP packet header. For example, one or more location attributes may be included in a GLO option of a destination options header. In various embodiments, the one or more location attributes may include country indications, region indications, city indications, and/or postal code indications associated with the computing device, such as customer computing device 103, 104, sending the IP packet. In various embodiments, the one or more location attributes may include country indications, region indications, city indications, and/or postal code indications associated with the computing device, such as CPEs 105, 106, that are the first computing device in a routing path receiving IP packets from IP packet originating computing devices, such as customer computing devices 103, 104. In various embodiments, a computing device receiving the IP packet, such as an application server 122, may handle the IP packet based at least in part on the one or more location attributes in an IP packet header. For example, IP packets from customer computing device 104 may indicate in a GLO option of a destination options header that the customer computing device 104 is located in geographic area B and the application server 122 may handle the IP packets from customer computing device 104 accordingly. In this manner, even though customer computing devices 103, 104 both send packets to application server 122 via network router 110, which is located in geographic area A, the GLO option of the destination options header in the respective IP packets from customer computing devices 103, 104 may enable application server 122 to distinguish and determine the different locations of customer computing devices 103, 104 in geographic locations A and B, respectively.

Figure 2A:
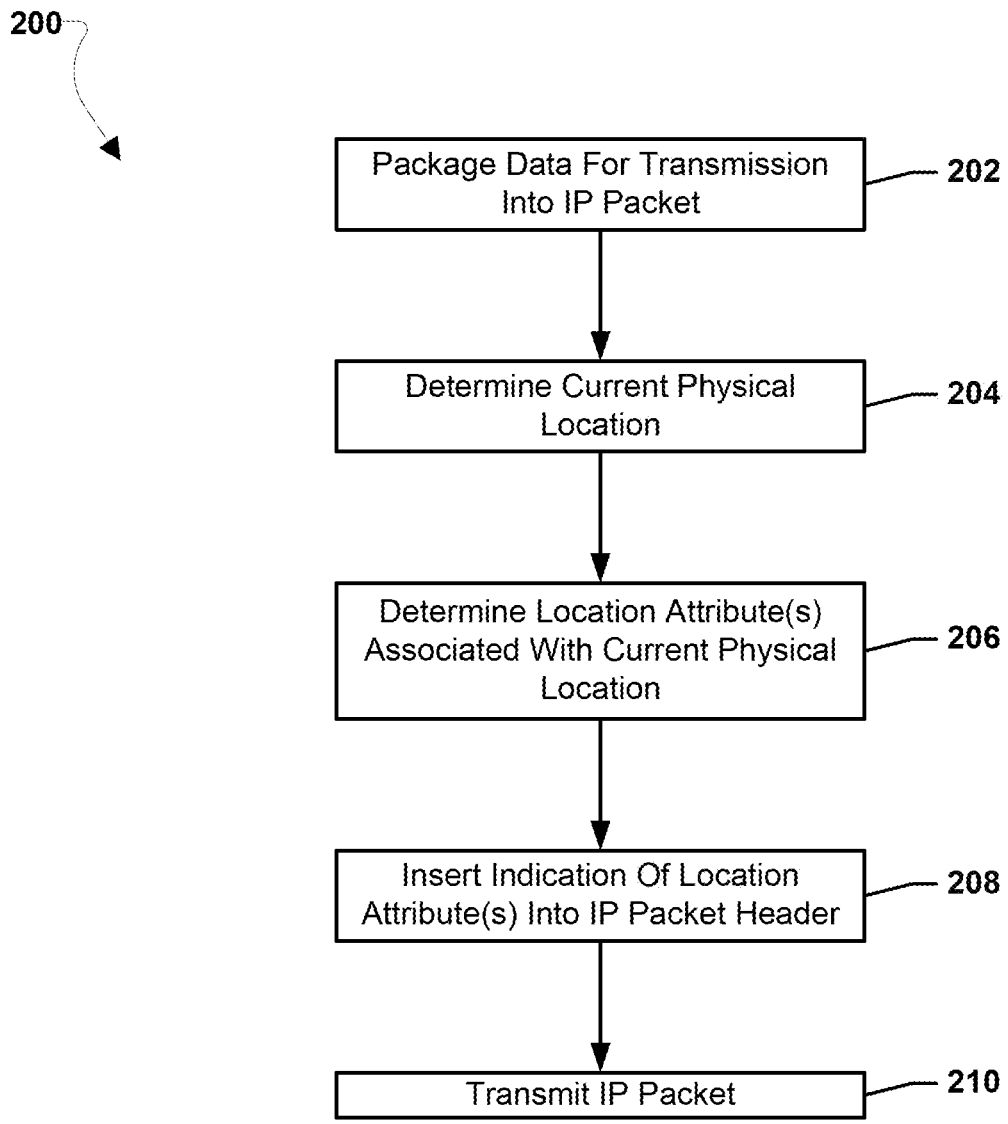
FIG. 2A is a process flow diagram illustrating an embodiment method for indicating IP packet source geolocation.

FIG. 2A illustrates an embodiment method 200 for indicating IP packet source geolocation. With reference to FIGS. 1-2A, the operations of method 200 may be performed by a processor of a computing device, such as a customer computing device 103, 104, etc.

In block 202, the processor may package data for transmission into an IP packet. For example, the processor may package data for transmission into an IPv4 packet, an IPv6 packet, etc. The data may be data for an Internet based application (e.g., Pandora®, Netflix®, Facebook®, Hulu®, online gaming, DirectTV streaming video, etc.). For example, the data may be data used to request provisioning of the Internet based application to the computing device. In some embodiments, the data to be packaged into an IP packet may be initial data enabling a handshake operation between the computing device and a server providing an Internet based application to occur. For example, the data may be data enabling a TCP based request for Internet based application services.

In block 204, the processor may determine a current physical location. In some embodiments, the current physical location may be determined based on user input to the computing device. For example, a user may input one or more of the country, region, city, postal code, address, latitude, longitude, etc., at which the computing device is currently being used into a graphical user interface provided by the operating system (e.g., Windows®, MacOS®, Linux®, etc.) and/or another application running on a processor of the computing device. In such examples, the current physical location information entered by the user may be stored in a memory location of the computing device and the processor may determine its current physical location by reading the information stored at the memory location. In some embodiments, the current physical location of the computing device may be determined based on information provided by a location device, such as coordinates from a global navigation satellite system (GNSS) chip set of the computing device, location information provided by another connected computing device, etc. In some embodiments, the current physical location of the computing device may be determined based on combinations of user entered information and information provided by a location device.

In block 206, the processor may determine one or more location attributes associated with the current physical location. For example, the processor may determine country indications, region indications, city indications, and/or postal code indications associated with its current physical location. As one example, the processor may determine the one or more location attributes based on the one or more attributes being stored as the current physical location in a memory location. As another example, the processor may determine the one or more location attributes by correlating a coordinate (e.g., a latitude and longitude) to a location on a map stored in a memory and determining the location attributes for the correlated location as the one or more location attributes associated with the current physical location.

In block 208, the processor may insert an indication of the one or more location attributes into the IP packet header. For example, the processor may populate the indication of the determined one or more location attributes as geolocation information in the GLO option of a destination options header of an IP packet, such as an IPv6 packet, etc. The indications may include one or more of country indications, region indications, city indications, and/or postal code indications associated with a computing device. In some embodiments, the processor may insert the indication of the determined one or more location attributes associated with the current physical location into every packet to be transmitted by the computing device. In some embodiments, the processor may insert the indication of the determined one or more location attributes associated with the current physical location into one a first or a first few packets to be transmitted by the computing device. For example, in TCP based requests only the first few packets used for establishing the TCP handshake may have the indications inserted therein.

In block 210, the processor may transmit the IP packet. For example, the processor may transmit the IP packet with the inserted IP packet header via a wired or wireless connection to a gateway router of an ISP, such as CPE 105, 106.

Figure 2B:
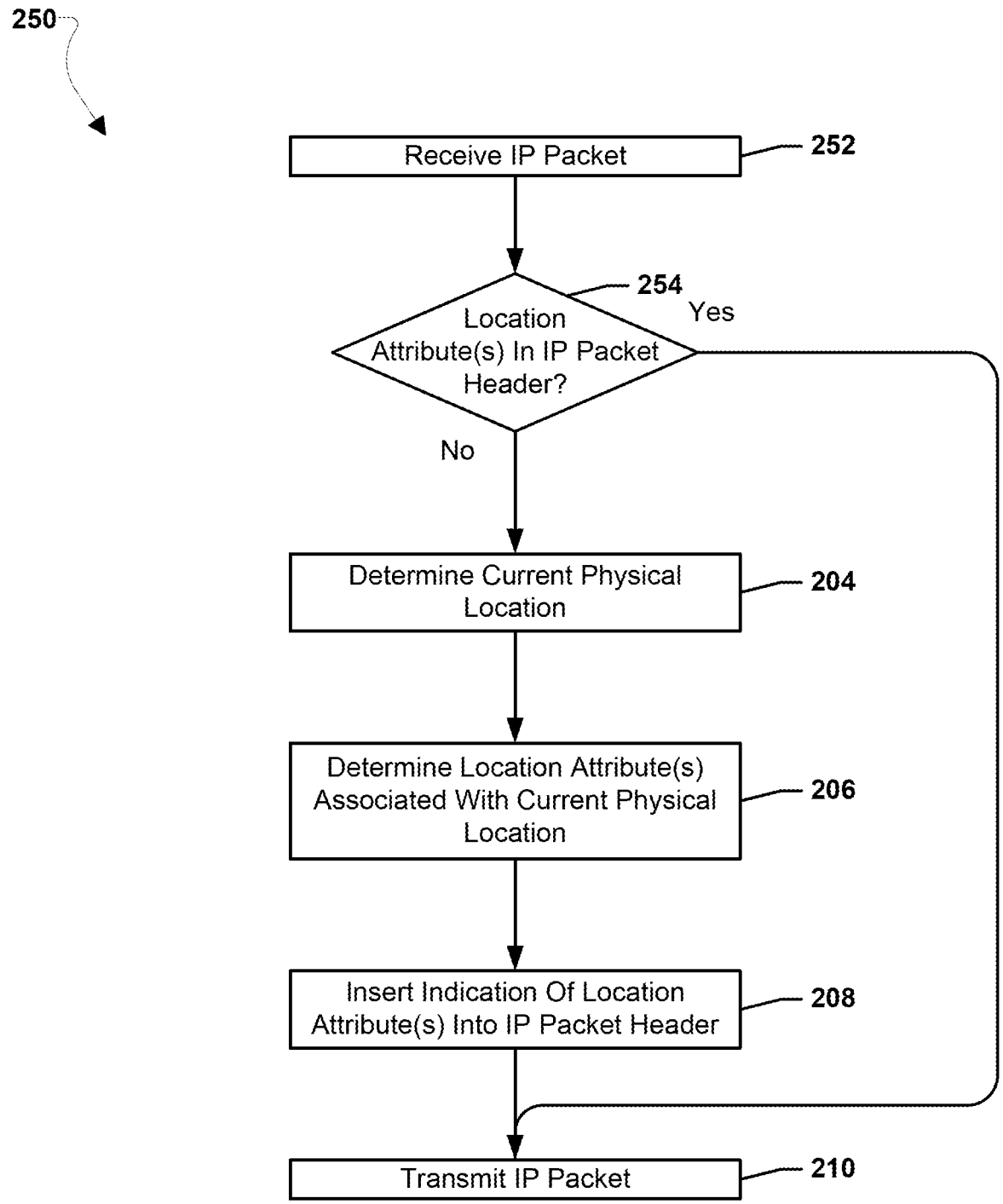
FIG. 2B is a process flow diagram illustrating another embodiment method for indicating IP packet source geolocation.

FIG. 2B illustrates an embodiment method 250 for indicating IP packet source geolocation. With reference to FIGS. 1-2B, the operations of method 250 may be performed by a processor of a computing device, such as a CPE 105, 106, etc. The operations of method 250 may be performed in conjunction with the operations of method 200 (FIG. 2A). In various embodiments, the operations of method 250 may be performed by a first computing device (e.g., CPE 105, 106) in a routing path receiving an IP packet, such as a gateway of an ISP that receives IP packets from an IP packet originating computing device (e.g., customer computing device 103, 104).

In block 252, the processor may receive an IP packet. As an example, the IP packet may be an IP packet, such as an IPv6 packet, etc., originated by another computing device, such as customer computing device 103, 104, etc., being routed toward a destination, such as application server 122, 133, 134, etc., through a routing enabled computing device, such as CPE 105, 106, etc. The IP packet may include data for the destination node. The data may be data for an Internet based application (e.g., Pandora®, Netflix®, Facebook®, Hulu®, online gaming, DirectTV streaming video, etc.). For example, the data may be data used to request provisioning of the Internet based application to the computing device. In some embodiments, the data to be packaged into an IP packet may be initial data enabling a handshake operation between a computing device and a server providing an Internet based application to occur. For example, the data may be data enabling a TCP based request for Internet based application services.

In determination block 254, the processor may determine whether one or more location attributes are indicated in the IP packet header. For example, the processor may determine whether a GLO option of a destination options header is included in the IP packet to determine whether one or more location attributes are indicated in the IP packet.

In response to determining that location attributes are indicated in the IP packet header (i.e., determination block 254="Yes"), the processor may transmit the IP packet in block 210 as described with reference to method 200 (FIG. 2A). In this manner, the computing device may merely route IP packets that already include indications of location attributes, such as IP packets having a GLO option of a destination options header, toward their intended destinations.

In response to determining that location attributes are not indicated in the IP packet header (i.e., determination block 254="No"), the processor may perform operations of blocks 204, 206, 208, and 210 to insert an indication of location attributes as described above with reference to method 200 (FIG. 2A). The location information may reflect the current physical location of the computing device that received the IP packet in block 252. In this manner, when the received IP packets do not include an indication of location attributes (e.g., the IP packets do not include a GLO option of a destination options header), the computing device may add an indication of its own location attributes to the IP packets (e.g., a GLO option of a destination options header). When the computing device is a CPE (e.g., CPE 105, 106), the CPE may be generally located with the computing device that originated the IP packet (e.g., in the same building, etc.) and the location attributes of the CPE may stand-in for the location attributes of the originating computing device.

Figure 3A:
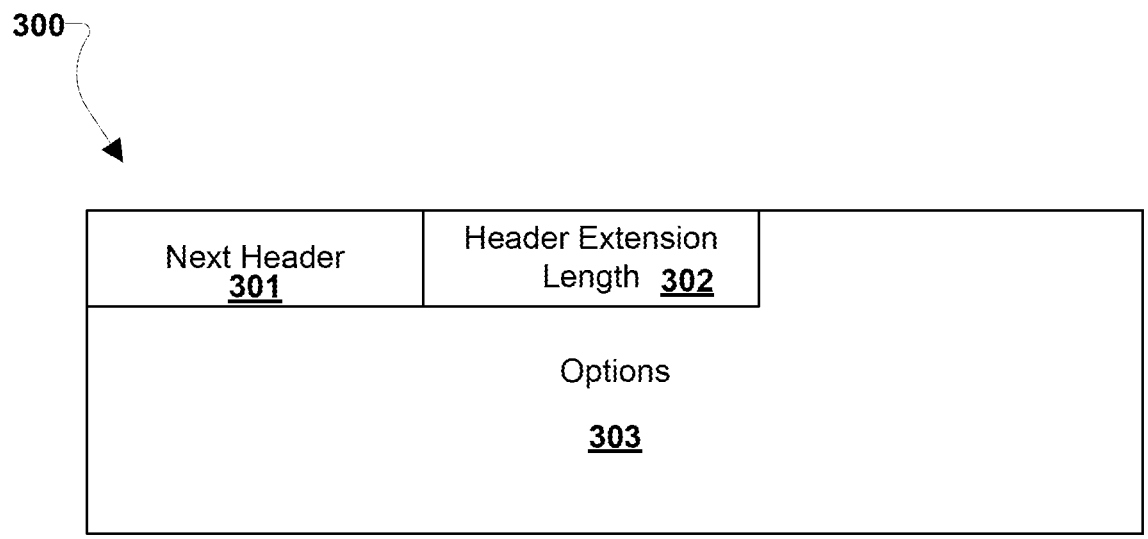
FIG. 3A is a block diagram of a destination options header for an IP packet suitable for use with various embodiments.

FIG. 3A is a block diagram of a destination options header 300 for an IP packet suitable for use with various embodiments. With reference to FIGS. 1-3A, the destination options header 300 may include an indication of a next header 301, a header length extension 302, and various options 303, such as a GLO option. The destination options header 300 may be used to carry optional information that needs to be examined only by a packet's destination nodes and may be identified by a next header 301 value of 60 in an immediately preceding header.

Figure 3B:
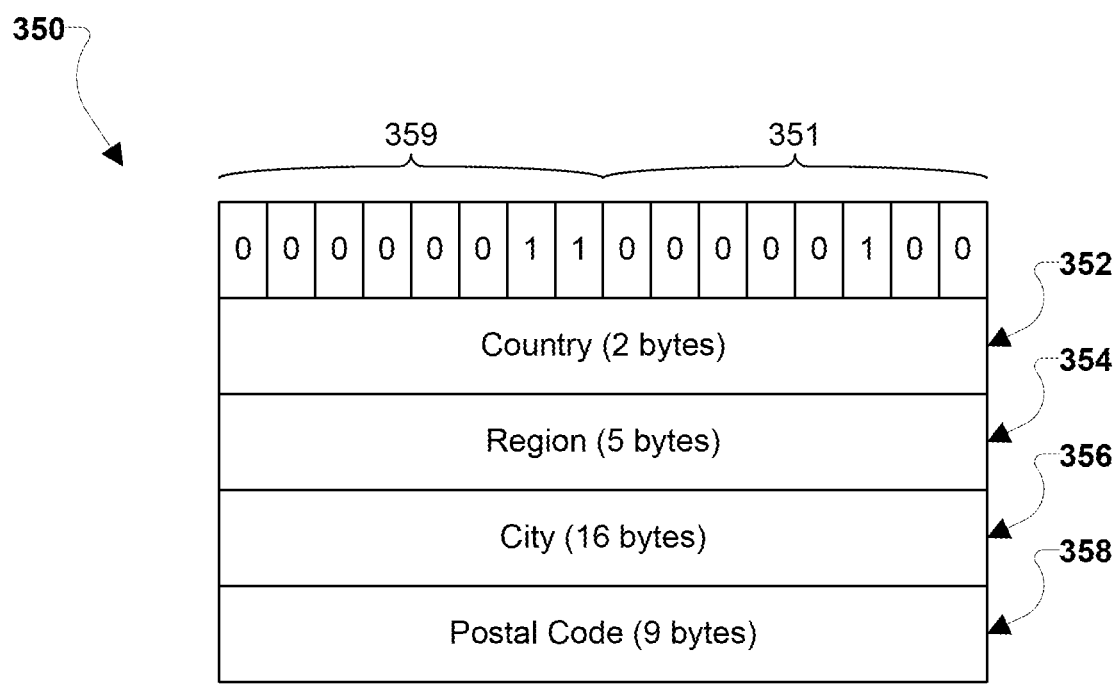
FIG. 3B is a block diagram of an embodiment geolocation (GLO) option for a destination options header of an IP packet.

FIG. 3B is a block diagram of an embodiment GLO option 350 for a destination options header of an IP packet, such as destination options header 300 (FIG. 3A). With reference to FIGS. 1-3B, as an example, a GLO option 350 of a destination options header of an IP packet, such as an IPv6 packet, etc., according to various embodiments may be optional. The GLO option 350 according to various embodiments may include various indications such as one or more of an option type indication 359, an option data length indication 351, a country code indication 352, a region indication 354, a city indication 356, and a postal code indication 358. As an example, a GLO option 350 of a destination options header of an IP packet, such as IPv6 packet, etc., according to various embodiments may be a 34 byte header include an option type indication 359, an option data length indication 351, a country code indication 352, a region indication 354, a city indication 356, and a postal code indication 358. The first two bytes of data of the GLO option 350 (the option type indication 359 and the option data length indication 351, respectively) may indicate attributes of the GLO option 350. As a specific example, the first eight bits being a value of three may identify the GLO option 350 and the second eight bits being a value of four may indicate the length of the GLO option's 350 data is 32 bytes. The GLO option 350 may include a country code indication 352, such as a country code field, etc., region indication 354, such as a region field, etc., a city indication 356, such as a city field, etc., and a postal code indication 358, such as a postal code field, etc. As specific examples, a country code field may be a two byte field indicating a country code (e.g., US for United States, CN for China, JP for Japan, PL for Poland, etc.). A region field may be a five byte field indicating the International Organization for Standardization (ISO) region code, such as the region code conforming to ISO standard 3166-2 (e.g., US-CO for the US state of Colorado, CN-GD for Guangdong province in China, etc.). A city field may be a sixteen byte field indicating the name of a city (e.g., New York, Paris, etc.). The name of the city may be padded with leading blanks if shorter than 15 characters, may be truncated if longer than 15 characters, and spaces in the city name may be counted as character and left blank. A postal code field may be a nine byte field. When the postal code is less than nine digits it may have leading zeros. For example, a five digit US postal code for Greenwood Village, Colo. of 80111 may be reflected by a postal code of 000080111 with four leading zeros.

Figure 4A:
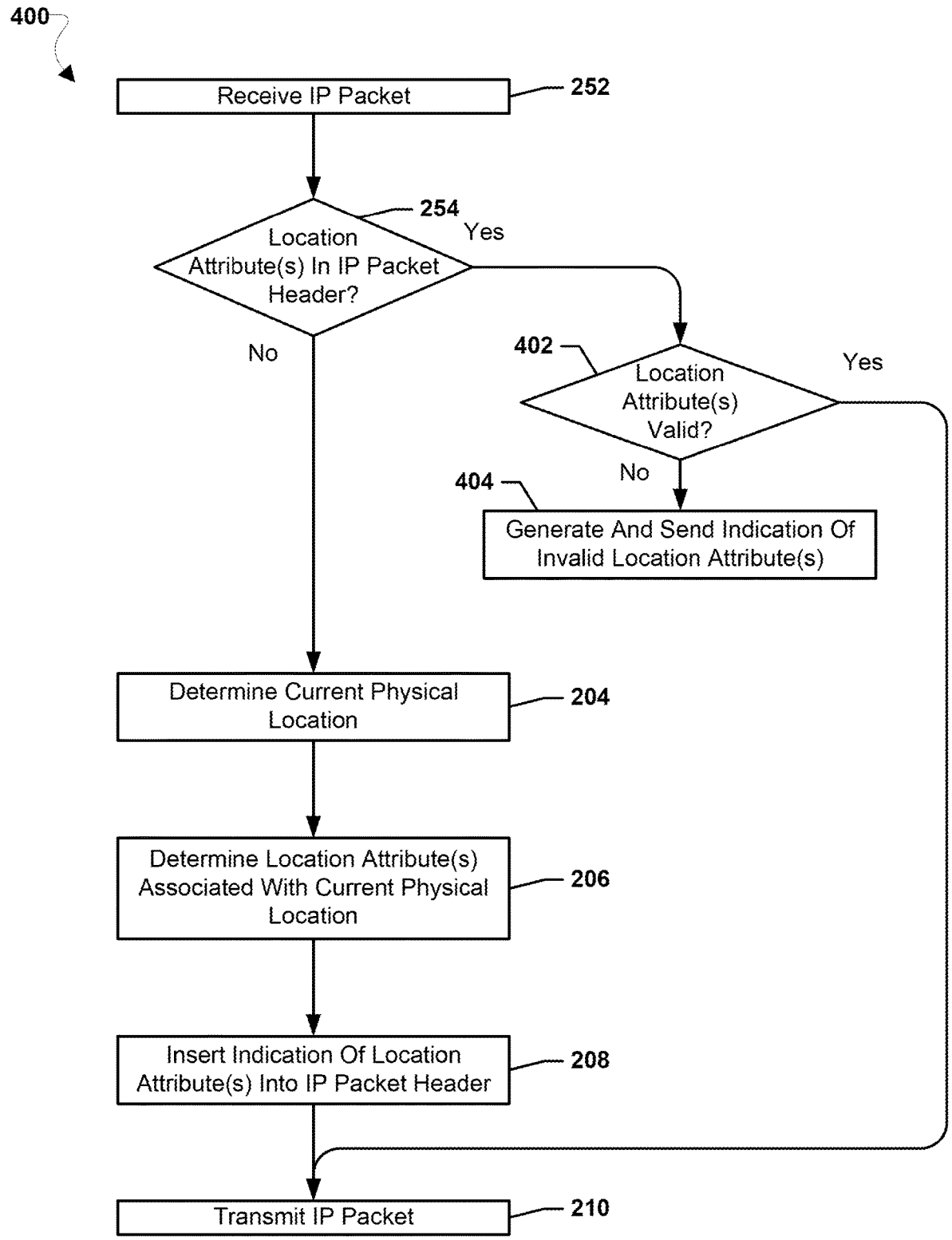
FIG. 4A is a process flow diagram illustrating an embodiment method for routing IP packets based on IP packet source geolocation.

FIG. 4A illustrates an embodiment method 400 for routing IP packets based on IP packet source geolocation. With reference to FIGS. 1-4A, the operations of method 400 may be performed by a processor of a computing device, such as a CPE 105, 106, etc. The operations of method 400 may be performed in conjunction with the operations of method 200 (FIG. 2A). In various embodiments, the operations of method 250 may be performed by a first computing device (e.g., CPE 105, 106) in a routing path receiving an IP packet, such as a gateway of an ISP that receives IP packets from an IP packet originating computing device (e.g., customer computing device 103, 104).

As described with reference to method 250 (FIG. 2B), the processor may receive an IP packet in block 252 and determine whether one or more location attributes are indicated in the IP packet header in block 254.

In response to determining that location attributes are indicated in the IP packet header (i.e., determination block 254="Yes"), the processor may determine whether the one or more location attributes are valid in determination block 402. For example, the processor may compare a country indication in the GLO option of a destination options header to a country indication for where the processor is located. The country indications not matching may indicate the computing device generating the IP packet did not insert valid location attributes.

In response to determining that the one or more location attributes are not valid (i.e., determination block 402="No"), the processor may generate and send an indication of one or more invalid location attributes in block 404. For example, the indication of one or more invalid location attribute may be a message to the computing device that originated the IP packet that at least one location attribute was invalid. Additionally, the processor may take other actions with the IP packet, such as dropping the IP packet. In this manner, the processor may enforce location information usage in the network path.

In response to determining that the one or more location attributes are valid (i.e., determination block 402="Yes"), the processor may transmit the IP packet in block 210 as described with reference to method 200 (FIG. 2A). In this manner, the computing device may merely route IP packets that already include valid indications of location attributes, such as IP packets having a GLO option of a destination options header, toward their intended destinations.

In response to determining that location attributes are not indicated in the IP packet header (i.e., determination block 254="No"), the processor may perform operations of blocks 204, 206, 208, and 210 to insert an indication of location attributes as described above with reference to method 200 (FIG. 2A). The location information may reflect the current physical location of the computing device that received the IP packet in block 252. In this manner, when the received IP packets do not include an indication of location attributes (e.g., the IP packets do not include a GLO option of a destination options header), the computing device may add an indication of its own location attributes to the IP packets (e.g., a GLO option of a destination options header). When the computing device is a CPE (e.g., CPE 105, 106), the CPE may be generally located with the computing device that originated the IP packet (e.g., in the same building, etc.) and the location attributes of the CPE may stand-in for the location attributes of the originating computing device.

Figure 4B:
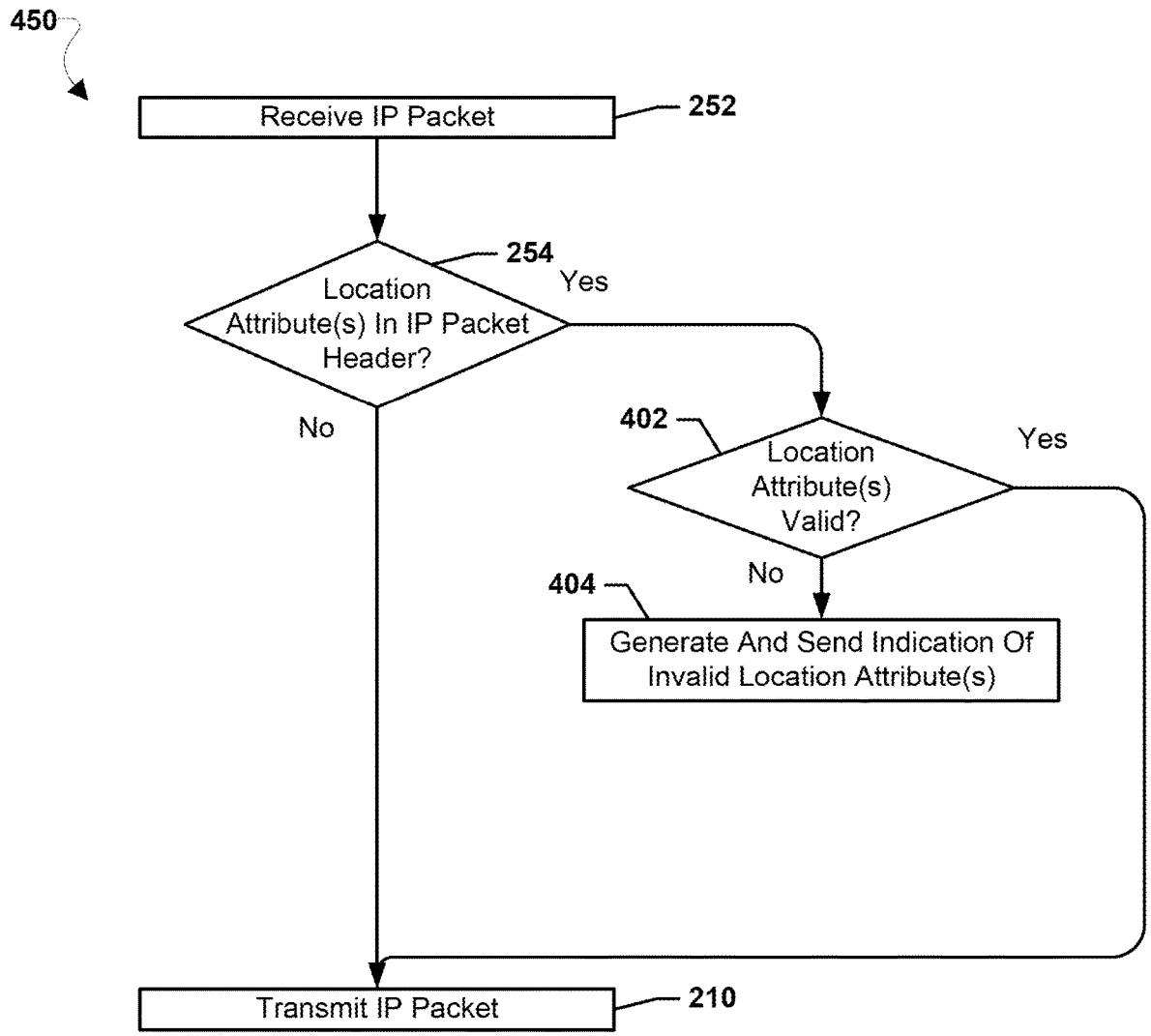
FIG. 4B is a process flow diagram illustrating another embodiment method for routing IP packets based on IP packet source geolocation.

FIG. 4B illustrates an embodiment method 450 for routing IP packets based on IP packet source geolocation. With reference to FIGS. 1-4B, the operations of method 450 may be performed by a processor of a computing device, such as a CPE 105, 106, network router 110, 120, 131, 132, etc. The operations of method 450 may be performed in conjunction with the operations of any of methods 200 (FIG. 2A), 250 (FIG. 2B), and 400 (FIG. 4A).

As described with reference to method 250 (FIG. 2B), the processor may receive an IP packet in block 252 and determine whether one or more location attributes are indicated in the IP packet header in block 254.

In response to determining that location attributes are not indicated in the IP packet header (i.e., determination block 254="No"), the processor may transmit the IP packet in block 210 as described with reference to method 200 (FIG. 2A). In this manner, the computing device may merely route IP packets that do not indicated location attributes, such as IP packets without a GLO option of a destination options header, toward their intended destinations.

In response to determining that location attributes are indicated in the IP packet header (i.e., determination block 254="Yes"), as described above in reference to method 400 (FIG. 4A), the processor may determine whether the one or more location attributes are valid in determination block 402, as well as generate and send an indication of invalid location attributes in block 404 or transmit the IP packet in block 210.

Figure 5:
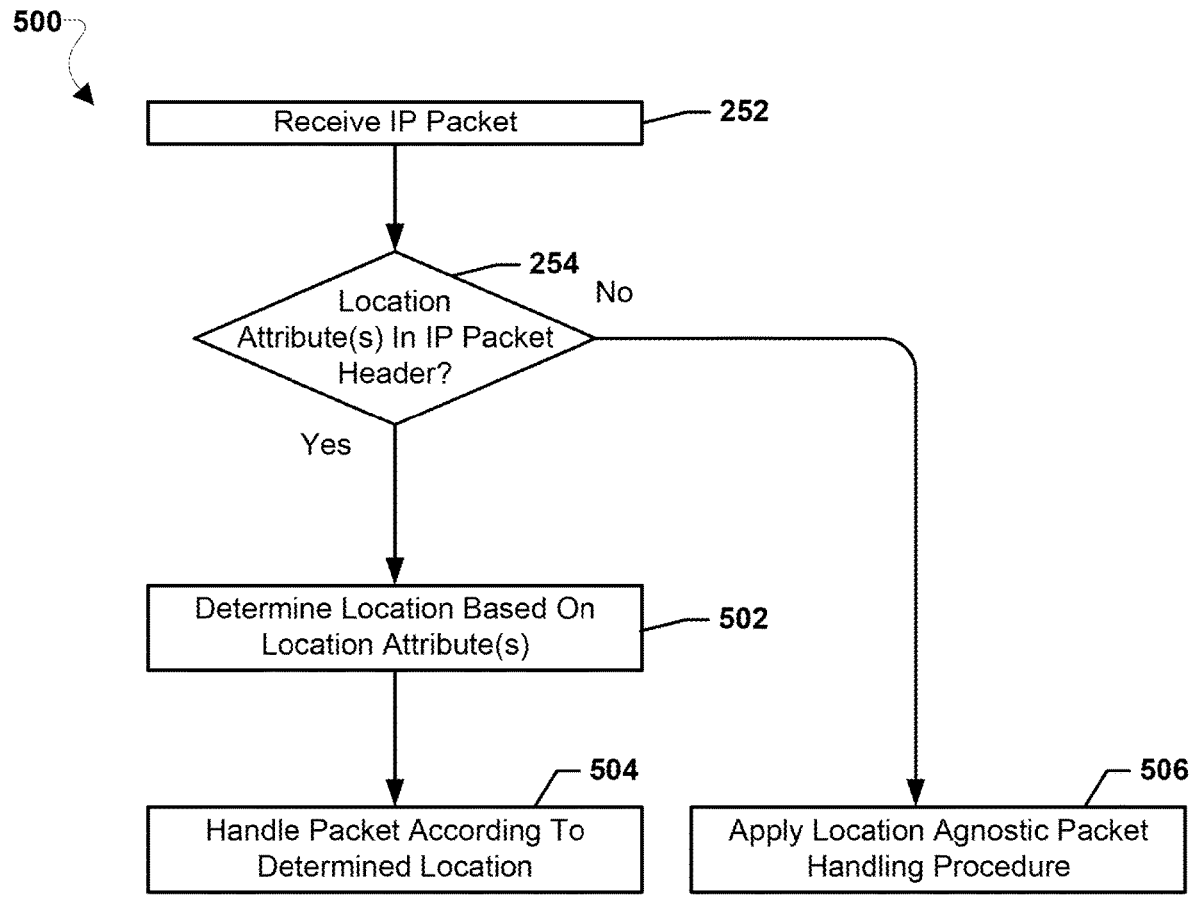
FIG. 5 is a process flow diagram illustrating an embodiment method for handling IP packets based on IP packet source geolocation.

FIG. 5 illustrates an embodiment method 500 for handling IP packets based on IP packet source geolocation. With reference to FIGS. 1-5, the operations of method 500 may be performed by a processor of a computing device, such as application server 122, 133, 134, etc. The operations of method 500 may be performed in conjunction with the operations of any of methods 200 (FIG. 2A), 250 (FIG. 2B), 400 (FIG. 4A), and 450 (FIG. 4B).

As described with reference to method 250 (FIG. 2B), the processor may receive an IP packet in block 252 and determine whether one or more location attributes are indicated in the IP packet header in block 254.

In response to determining that location attributes are not indicated in the IP packet header (i.e., determination block 254="No"), the processor may apply a location agnostic packet handling procedure in block 506. For example, the processor may apply a default handling procedure as the location of the originating computing device (e.g., customer computing device 103, 104) may not be determinable from the received IP packet itself because the received IP packet may not include a GLO option of a destination options header.

In response to determining that location attributes are indicated in the IP packet header (i.e., determination block 254="Yes"), the processor may determine a location based on the one or more location attributes in block 502. For example, a processor of an application server 122, 133, 134, etc. may use one or more of the country indications, region indications, city indications, and/or postal code indications indicated in a GLO option of a destination options header to determine the location of the originating computing device (e.g., customer computing device 103, 104).

In block 504, the processor may handle the IP packet according to the determined location. For example, the processor may check the location of the originating computing device (e.g., customer computing device 103, 104) from which to honor or deny service request. As another example, the processor may select a most likely language in which to provide the service based on the location of the originating computing device (e.g., customer computing device 103, 104). As a further example, the processor may enforce geographic content restrictions based on the location of the originating computing device (e.g., customer computing device 103, 104).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200, 250, 400, 450, and 500 may be substituted for or combined with one or more operations of the methods 200, 250, 400, 450, and 500, and vice versa.

Figure 6:
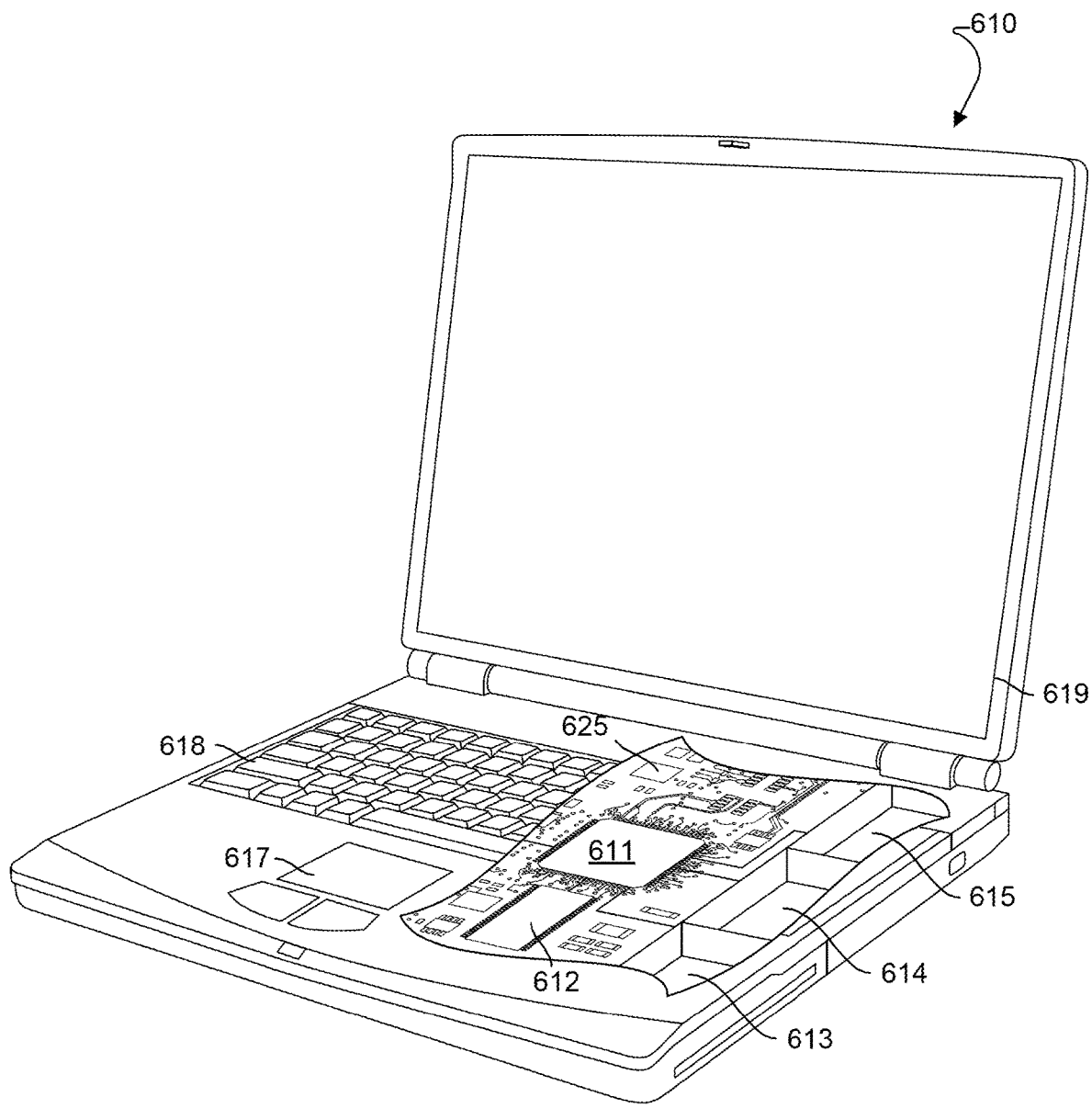
FIG. 6 is a component diagram of an example computing device suitable for use with various embodiments.

The various embodiments (including, but not limited to, embodiments discussed above with reference to FIGS. 1-5) described above may also be implemented within a variety of computing devices, such as a laptop computer 610 as illustrated in FIG. 6. Many laptop computers include a touch pad touch surface 617 that serves as the computer's pointing device, and thus may receive drag, scroll, and flick gestures similar to those implemented on mobile computing devices equipped with a touch screen display and described above. A laptop computer 610 will typically include a processor 611 coupled to volatile memory 612 and a large capacity nonvolatile memory, such as a disk drive 613 of Flash memory. The laptop computer 610 may also include a floppy disc drive 614 and a compact disc (CD) drive 615 coupled to the processor 611. The laptop computer 610 may also include a number of connector ports coupled to the processor 611 for establishing data connections or receiving external memory devices, such as a USB or FireWire® connector sockets, or other network connection circuits (e.g., interfaces) for coupling the processor 611 to a network. The laptop computer 610 may also include a location device 625 connected to the processor 611, such as a GNSS chip set, etc. In a notebook configuration, the computer housing may include the touchpad 617, the keyboard 618, and the display 619 all coupled to the processor 611. Other configurations of the computing device may include a computer mouse or trackball coupled to the processor (e.g., via a USB input) as are well known, which may also be used in conjunction with the various embodiments.

Figure 7:
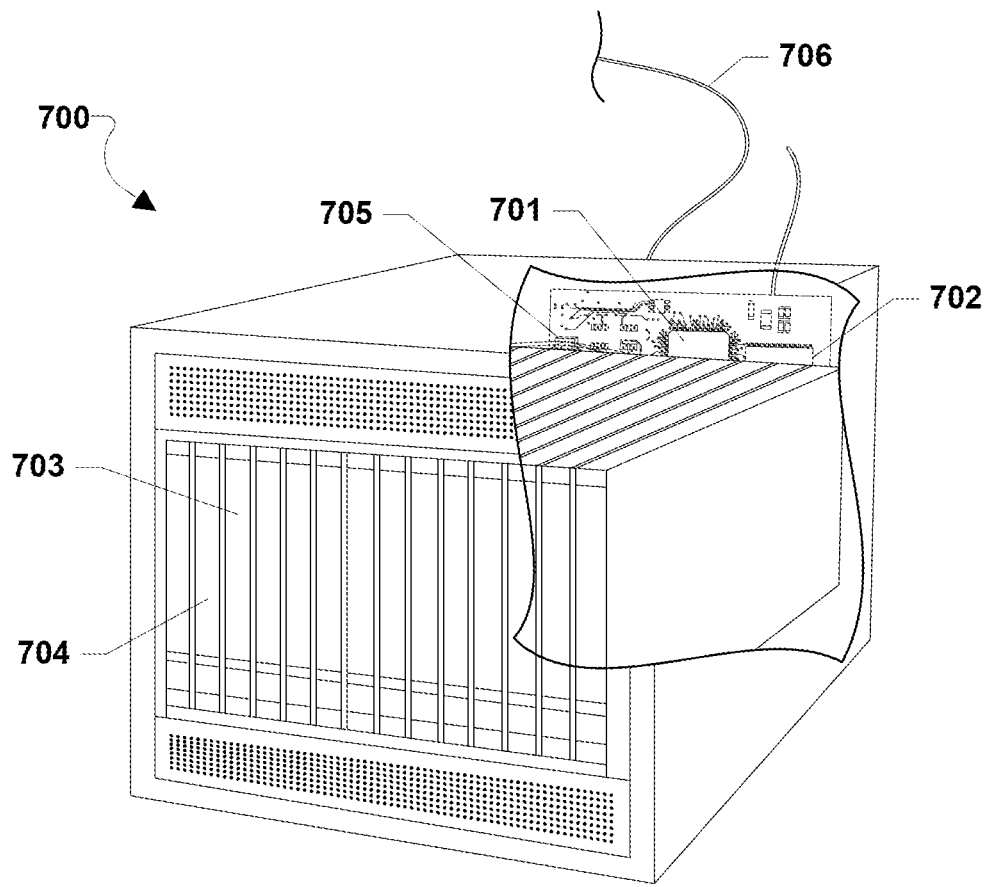
FIG. 7 is a component diagram of an example server suitable for use with the various embodiments.

Various embodiments (including, but not limited to, embodiments discussed above with reference to FIGS. 1-5) may be implemented on any of a variety of commercially available server devices, such as the server device 700 illustrated in FIG. 7. Such a server device 700 may include a processor 701 coupled to volatile memory 702 and a large capacity nonvolatile memory, such as a disk drive 703. The server device 700 may also include a floppy disc drive, compact disc (CD) or DVD disc drive 704 coupled to the processor 701. The server device 700 may also include network access ports 706 coupled to the processor 701 for establishing data connections with a network connection circuit 705 and a communication network (e.g., IP network) coupled to other communication system network elements.

Figure 8:
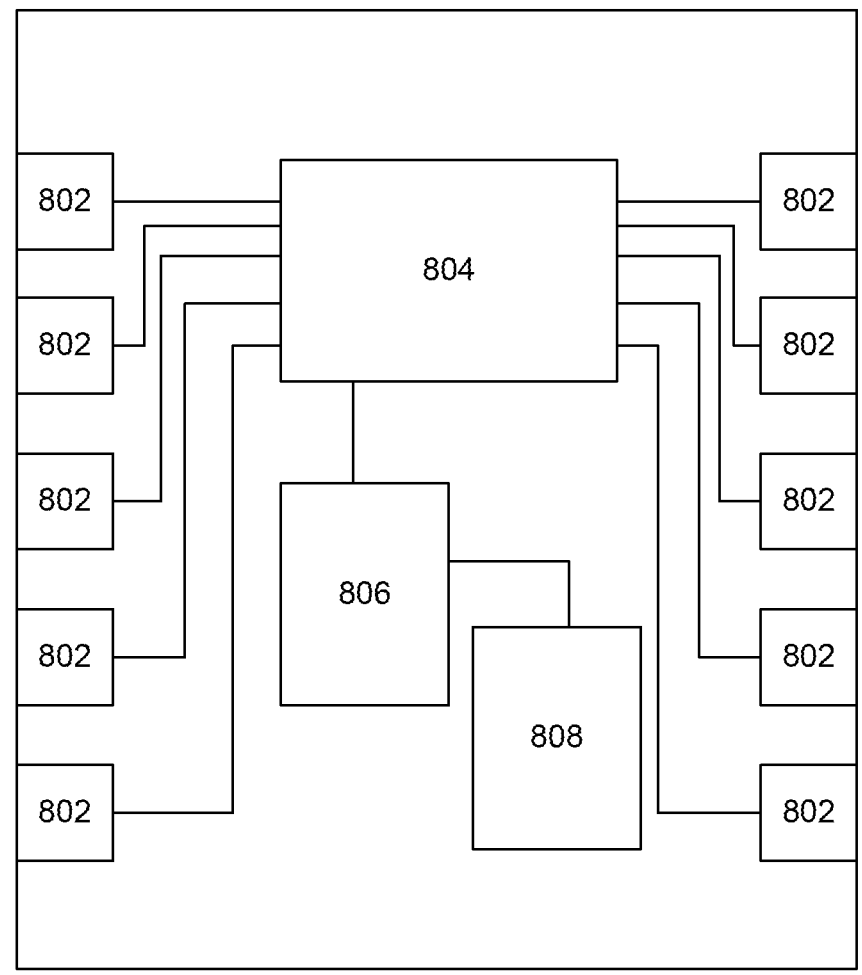
FIG. 8 is a component diagram of an example computing device suitable for use with various embodiments.

Various embodiments (including, but not limited to, embodiments discussed above with reference to FIGS. 1-5) may be implemented on any of a variety of commercially available computing devices, such as CPEs, routers, etc., such as the computing device 800 illustrated in FIG. 8. Such a computing device 800 may include a processor 806 coupled to one or more memories 808. The computing device 800 may include a series of wired and/or wireless network access ports 802 coupled to switching circuitry controlled by the processor 806. The network access ports 802 may establish data connections to one or more communication networks (e.g., IP networks) coupled to other communication system network elements. The switching circuitry 804 may be controlled by processor 806 to route packets from one or more network access ports 802 to one or more other network access ports 802 to thereby interconnect one or more communication networks, one or more communications system network elements, and/or one or more other computing devices.

The processors 611, 701, 806 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 611, 701, 806. The processors 611, 701, 806 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 611, 701, 806 including internal memory or removable memory plugged into the device and memory within the processors 611, 701, 806 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of indicating Internet Protocol (IP) packet source geolocation, comprising:
   receiving, in a processor of a computing device, an IP packet having an IP packet header;
   determining, by the processor, whether one or more location attributes are indicated in the IP packet header;
   determining, by the processor, whether the one or more location attributes are valid in response to determining that one or more location attributes are indicated in the IP packet header;
   generating an indication of an invalid location attribute in response to determining that one or more location attributes are invalid;
   determining, in the processor, one or more location attributes associated with a current physical location of the computing device in response to determining that one or more location attributes are not indicated in the IP packet header;
   inserting, by the processor, an indication of the one or more location attributes into an IP packet header in response to determining one or more location attributes associated with the current physical location of the computing device; and
   transmitting, by the processor, the IP packet header to an IP address.

2. The method of claim 1, wherein the IP packet header is a destination options header and the indication of the one or more location attributes is a geolocation option.

3. The method of claim 2, wherein the geolocation option has a length of 32 bytes.

4. The method of claim 2, wherein the geolocation option includes a 2 byte country field, a 5 byte region field, a 16 byte city field, and a 9 byte postal code field.

5. The method of claim 1, wherein the one or more location attributes are one or more of a country, a region, a city, and a postal code associated with the current physical location of the computing device.

6. The method of claim 1, wherein the one or more location attributes associated with the current physical location are user provided indications of one or more of a country, a region, a city, and a postal code in which the user is using the computing device.

7. A computing device for indicating Internet Protocol (IP) packet source geolocation, comprising:
   a processor configured with processor-executable instructions to:
      receive an IP packet having an IP packet header;
      determine whether one or more location attributes are indicated in the IP packet header;
      determine whether the one or more location attributes are valid in response to determining that one or more location attributes are indicated in the IP packet header;

generate an indication of an invalid location attribute in response to determining that one or more location attributes are invalid;

determine one or more location attributes associated with a current physical location of the computing device in response to determining that one or more location attributes are not indicated in the IP packet header;

insert an indication of the one or more location attributes into an IP packet header in response to determining one or more location attributes associated with the current physical location of the computing device; and transmit the IP packet header to an IP address.

8. The computing device of claim 7, wherein the IP packet header is a destination options header and the indication of the one or more location attributes is a geolocation option.

9. The computing device of claim 8, wherein the geolocation option has a length of 32 bytes.

10. The computing device of claim 8, wherein the geolocation option includes a 2 byte country field, a 5 byte region field, a 16 byte city field, and a 9 byte postal code field.

11. The computing device of claim 7, wherein the one or more location attributes are one or more of a country, a region, a city, and a postal code associated with the current physical location of the computing device.

12. The computing device of claim 7, wherein the one or more location attributes associated with the current physical location are user provided indications of one or more of a country, a region, a city, and a postal code in which the user is using the computing device.

13. A non-transitory processor-readable storage medium having stored thereon processor-executable instructions configured to cause a processor to perform operations, comprising:

receiving an IP packet having an IP packet header;

determining whether one or more location attributes are indicated in the IP packet header;

determining whether the one or more location attributes are valid in response to determining that one or more location attributes are indicated in the IP packet header;

generating an indication of an invalid location attribute in response to determining that one or more location attributes are invalid;

determining one or more location attributes associated with a current physical location of the computing device in response to determining that one or more location attributes are not indicated in the IP packet header;

inserting an indication of the one or more location attributes into an IP packet header in response to determining one or more location attributes associated with the current physical location of the computing device; and transmitting the IP packet header to an IP address.

14. The non-transitory processor-readable storage medium of claim 13, wherein the stored processor-executable instructions are configured to cause a processor to perform operations such that:

the IP packet header is a destination options header and the indication of the one or more location attributes is a geolocation option.

15. The non-transitory processor-readable storage medium of claim 14, wherein the stored processor-executable instructions are configured to cause a processor to perform operations such that the geolocation option has a length of 32 bytes.

16. The non-transitory processor-readable storage medium of claim 14, wherein the stored processor-executable instructions are configured to cause a processor to perform operations such that the geolocation option includes a 2 byte country field, a 5 byte region field, a 16 byte city field, and a 9 byte postal code field.

17. The non-transitory processor-readable storage medium of claim 13, wherein the stored processor-executable instructions are configured to cause a processor to perform operations such that the one or more location attributes are one or more of a country, a region, a city, and a postal code associated with the current physical location of the computing device.

18. The non-transitory processor-readable storage medium of claim 13, wherein the stored processor-executable instructions are configured to cause a processor to perform operations such that the one or more location attributes associated with the current physical location are user provided indications of one or more of a country, a region, a city, and a postal code in which the user is using the computing device.

* * * * *